US012563008B2

(12) United States Patent
Detmer et al.

(10) Patent No.: US 12,563,008 B2
(45) Date of Patent: Feb. 24, 2026

(54) CAPTURING AND UTILIZING CONTEXT DATA IN CROSS-CHANNEL CONVERSATION SERVICE APPLICATION COMMUNICATION SESSIONS

(71) Applicant: FMR LLC, Boston, MA (US)

(72) Inventors: Allen Detmer, Patriot, IN (US); Amanda Bedard, Independence, KY (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/532,076

(22) Filed: Dec. 7, 2023

(65) Prior Publication Data

US 2024/0195776 A1      Jun. 13, 2024

Related U.S. Application Data

(60) Provisional application No. 63/431,064, filed on Dec. 8, 2022.

(51) Int. Cl.
| | |
|---|---|
| *H04L 12/58* | (2006.01) |
| *G06F 17/30* | (2006.01) |
| *H04L 29/06* | (2006.01) |
| *H04L 29/08* | (2006.01) |
| *H04L 51/10* | (2022.01) |
| *H04L 51/56* | (2022.01) |

(52) U.S. Cl.
CPC .............. *H04L 51/56* (2022.05); *H04L 51/10* (2013.01)

(58) Field of Classification Search
CPC .......... H04L 51/56; H04L 51/10; H04L 51/02
See application file for complete search history.

(56) References Cited

U.S. PATENT DOCUMENTS

| | | | |
|---|---|---|---|
| 6,446,120 B1 | 9/2002 | Dantressangle | |
| 7,228,278 B2 | 6/2007 | Nguyen et al. | |
| 8,000,973 B2 * | 8/2011 | Williams .............. | G10L 13/027 704/275 |

(Continued)

OTHER PUBLICATIONS

"Gathering information with slots," IBM Cloud Docs / Watson Assistant (Managed), retrieved from https://cloud.ibm.com/docs/assistant?topics=assistant-dialog-slots on Feb. 16, 2021, 12 pages.

*Primary Examiner* — Umar Cheema
*Assistant Examiner* — Golam Mahmud
(74) *Attorney, Agent, or Firm* — Cesari and McKenna, LLP

(57) ABSTRACT

Methods and apparatuses are described for capturing and utilizing cross-channel context data in conversation service application communication sessions. A computing device establishes a first communication session between a first conversation service application and a first remote device. The orchestration utility detects an intent to transfer the first communication session to a second remote device. The orchestration utility captures context data generated during the first communication session. The computing device establishes a second communication session between a second conversation service application and the second remote computing device. The orchestration utility configures the second communication session based upon the context data, including synchronizing a state of the second communication session to a state of the first communication session.

24 Claims, 3 Drawing Sheets

(56)    References Cited

U.S. PATENT DOCUMENTS

| | | | |
|---|---|---|---|
| 8,493,913 B2 * | 7/2013 | Itzkovitz | H04M 7/0057 |
| | | | 370/328 |
| 9,015,297 B2 * | 4/2015 | Putman | H04L 67/51 |
| | | | 709/223 |
| 9,172,747 B2 | 10/2015 | Walters et al. | |
| 9,318,108 B2 | 4/2016 | Gruber et al. | |
| 10,109,297 B2 | 10/2018 | Brown et al. | |
| 10,127,224 B2 | 11/2018 | DeLeeuw | |
| 10,313,404 B2 | 6/2019 | Ein-Gil et al. | |
| 10,452,695 B2 | 10/2019 | Rodgers | |
| 10,681,307 B2 * | 6/2020 | Wood | G06Q 10/107 |
| 10,795,640 B1 | 10/2020 | Knight et al. | |
| 10,902,533 B2 | 1/2021 | McConnell et al. | |
| 11,196,863 B2 | 12/2021 | Spohrer | |
| 11,379,446 B1 | 7/2022 | Detmer et al. | |
| 11,463,387 B1 * | 10/2022 | Panati | G06F 9/542 |
| 11,468,282 B2 | 10/2022 | Sanghavi et al. | |
| 11,593,769 B2 * | 2/2023 | Khan | H04L 51/216 |
| 11,734,089 B2 | 8/2023 | Detmer | |
| 2003/0132958 A1 | 7/2003 | Himmel et al. | |
| 2007/0022160 A1 * | 1/2007 | Dauguet | G06Q 10/107 |
| | | | 709/204 |
| 2012/0041903 A1 | 2/2012 | Beilby et al. | |
| 2014/0279050 A1 | 9/2014 | Makar et al. | |
| 2016/0094492 A1 | 3/2016 | Li et al. | |
| 2017/0148073 A1 * | 5/2017 | Nomula | G06Q 30/0617 |
| 2017/0324867 A1 | 11/2017 | Tamblyn et al. | |
| 2018/0007099 A1 * | 1/2018 | Ein-Gil | H04L 65/403 |
| 2018/0131643 A1 * | 5/2018 | Trufinescu | G06F 3/048 |
| 2018/0337872 A1 | 11/2018 | Fawcett | |
| 2019/0089655 A1 | 3/2019 | Uppala et al. | |
| 2019/0095524 A1 | 3/2019 | Rodgers | |
| 2019/0180258 A1 | 6/2019 | Amar et al. | |
| 2019/0188590 A1 | 6/2019 | Wu et al. | |
| 2019/0258456 A1 | 8/2019 | Byun et al. | |
| 2019/0311036 A1 | 10/2019 | Shanmugam et al. | |
| 2020/0005118 A1 | 1/2020 | Chen et al. | |
| 2020/0007380 A1 | 1/2020 | Chen et al. | |
| 2020/0081939 A1 | 3/2020 | Subramaniam | |
| 2020/0120185 A1 * | 4/2020 | Salter | H04L 67/141 |
| 2020/0126540 A1 | 4/2020 | Panchamgam et al. | |
| 2020/0302405 A1 * | 9/2020 | Khan | G06Q 10/1097 |
| 2020/0364300 A1 | 11/2020 | Tan et al. | |
| 2021/0004390 A1 | 1/2021 | Li et al. | |
| 2021/0035239 A1 * | 2/2021 | Srivastava | H04L 51/04 |
| 2021/0142009 A1 | 5/2021 | Detmer et al. | |
| 2021/0312904 A1 | 10/2021 | Shukla et al. | |
| 2022/0182462 A1 * | 6/2022 | Salter | H04M 3/4936 |
| 2022/0276859 A1 * | 9/2022 | Brevoort | G06F 8/60 |

* cited by examiner

100

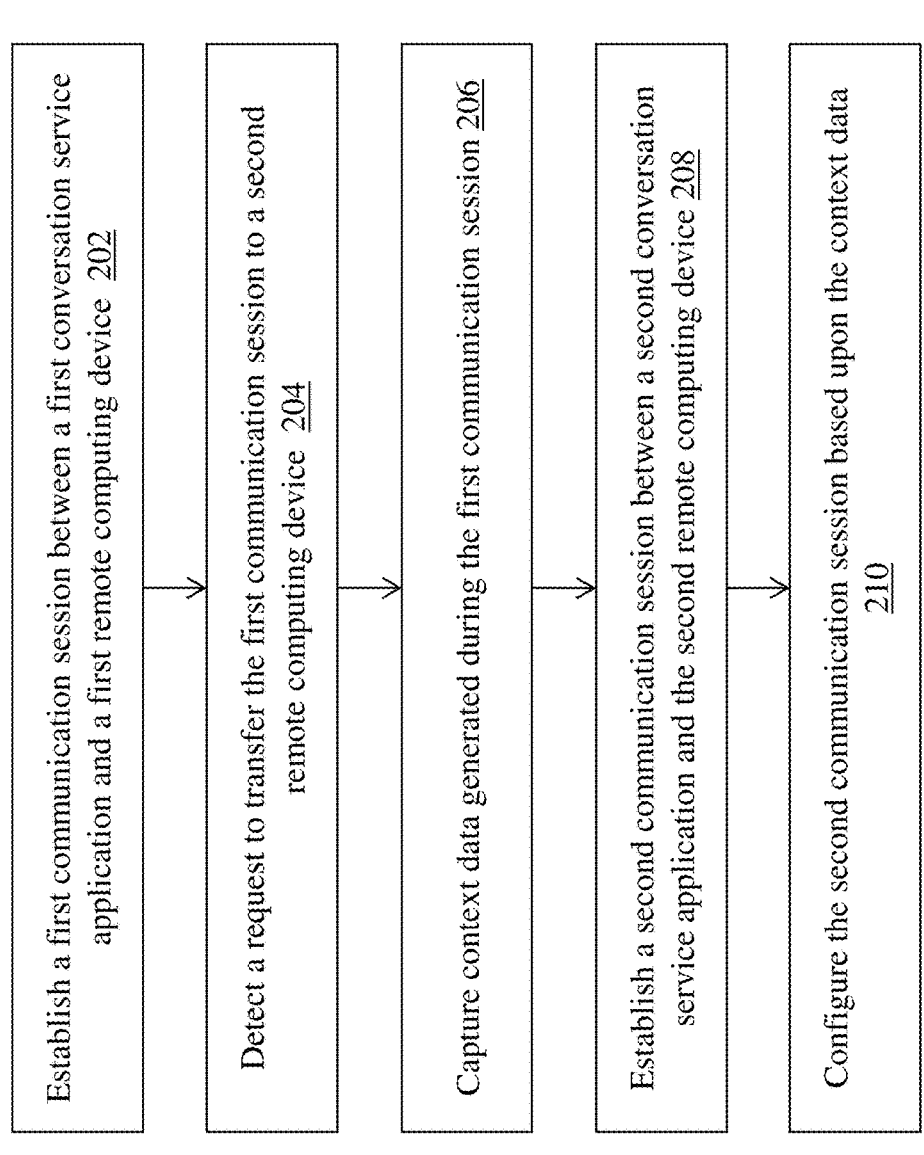

Establish a first communication session between a first conversation service application and a first remote computing device  202

Detect a request to transfer the first communication session to a second remote computing device  204

Capture context data generated during the first communication session  206

Establish a second communication session between a second conversation service application and the second remote computing device  208

Configure the second communication session based upon the context data  210

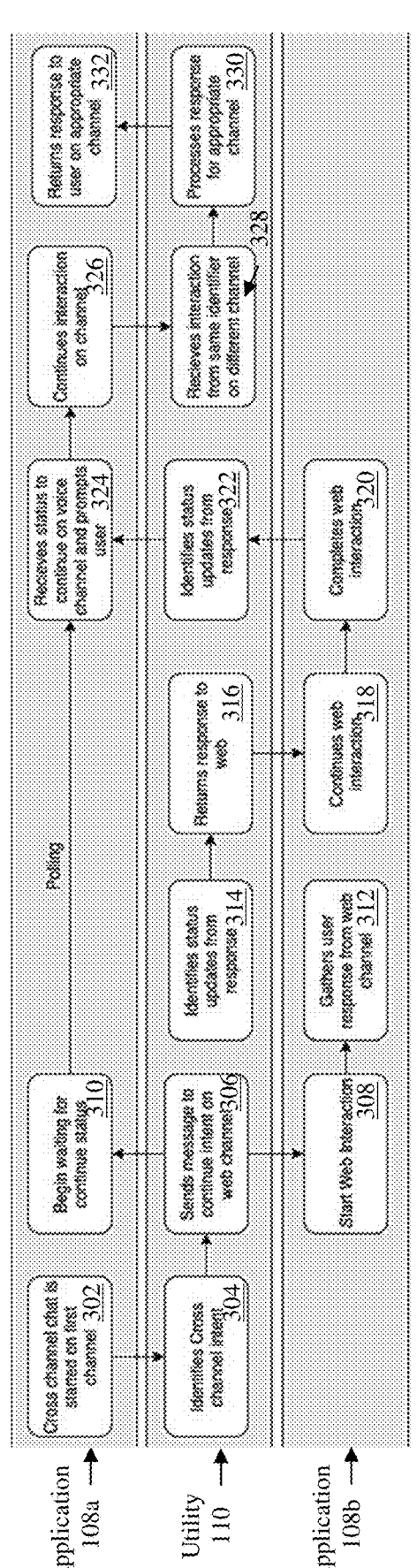

Application 108a →

Utility 110 →

Application 108b →

Cross channel chat is started on first channel 302

Identifies Cross channel intent 304

Begin waiting for continue status 310

Sends message to continue intent on web channel 306

Start Web interaction 308

Polling

Identifies status from response 314

Gathers user response from web channel 312

Returns response to web 316

Continues web interaction 318

Receives status to continue on voice channel and prompts user 324

Identifies status updates from response 322

Completes web interaction 320

Continues interaction on channel 326

Recieves interaction from same identifier on different channel 328

Returns response to user on appropriate channel 332

Processes response for appropriate channel 330

CAPTURING AND UTILIZING CONTEXT DATA IN CROSS-CHANNEL CONVERSATION SERVICE APPLICATION COMMUNICATION SESSIONS

RELATED APPLICATION(S)

This application claims priority to U.S. Provisional Patent Application No. 63/431,064, filed on Dec. 8, 2022, the entirety of which is incorporated by reference herein.

TECHNICAL FIELD

This application relates generally to methods and apparatuses, including computer program products, for capturing and utilizing context data in cross-channel conversation service application communication sessions.

BACKGROUND

As computing technology has become commonplace, many users have abandoned the use of live telephone conversations with service agents and representatives to answer questions and resolve issues, in favor of electronic communications such as text-based online chat sessions (e.g., via web browser or mobile app) and/or voice-based chat sessions (e.g., via smart assistant devices and platforms such as Amazon® Alexa™) that involve the use of computing devices and related software. In order to efficiently manage this form of communication, many organizations are turning to automated conversation service software applications such as virtual assistants (VAs) and chatbots to interact with end users intelligently using advanced language processing and data interpretation techniques. Many times, a conversation service software application can either resolve the end user's inquiry altogether or sufficiently identify the intent behind the end user's inquiry so that the chat-based communication session can be routed to a live customer service agent best equipped to handle the end user's request.

In some situations, an end user may begin a communication session with a first conversation service software application and during the session, the end user may wish to transition the interaction to a second conversation service software application. For example, an end user may start a voice-based chat session via telephone with an interactive voice response (IVR) conversation service software application and realize that it is too difficult to perform a particular interaction (e.g., updating profile information) via a voice-based interface. The end user may want to transition to a text-based chat session via a web browser to complete the interaction. In another example, an end user may want to conduct a multi-channel communication session, interacting with a virtual assistant application on their smartphone while also using a chatbot via a web browser.

However, current conversation service software applications often lack robust mechanisms for capturing, storing, and sharing session context data across different communication channels. As noted above, an end user may begin updating his mailing address using a voice-based VA channel on a smart assistant device by authenticating to the smart assistant device and initiating a workflow to change his address. During the workflow, the end user can decide to transition to a web-based chat VA channel to complete the address change. Typically, the voice-based VA is unable to provide any intent and/or context data to the web-based chat VA that would enable the chat VA to seamlessly continue with the workflow. Often, the web-based chat VA requires the end user to repeat information already provided or re-authenticate to the platform. Also, once the transition between channels is complete, there is typically no way for the end user to transition back to the original channel without starting a new communication session and re-establishing the context for the interaction. This scenario is inefficient and leads to longer interaction times along with reduced satisfaction of customer experience.

SUMMARY

Therefore, what is needed are improved computerized methods and systems for capturing and utilizing context data in conversation service application communication sessions. The techniques described herein advantageously provide an application-agnostic mechanism for capture and transfer of application-specific session context information during a specific chat-based communication session, such that a conversation service application such as a virtual assistant application (VA) can be configured to seamlessly capture the session context data elements relating to a conversation conducted on a first channel and automatically provide those data elements to a second VA application on a second channel to continue the conversation from a determined workflow state—resulting in a more positive end user experience and more efficient execution of the chat session across multiple communication channels and devices.

The invention, in one aspect, features a computer system for capturing and utilizing cross-channel context data in conversation service application communication sessions. The system includes a computing device having a memory that stores computer-executable instructions and a processor that executes the computer-executable instructions. The computing device establishes a first communication session between a first conversation service application and a first remote computing device, the first conversation service application coupled to an orchestration utility of the computing device. The orchestration utility detects a request to transfer the first communication session to a second remote computing device. The orchestration utility captures context data generated during the first communication session including a state of the first communication session. The computing device establishes a second communication session between a second conversation service application and the second remote computing device, the second conversation service application coupled to the orchestration utility. The orchestration utility configures the second communication session based upon the context data, including synchronizing a state of the second communication session to the state of the first communication session.

The invention, in another aspect, features a computerized method of capturing and utilizing cross-channel context data in conversation service application communication sessions. A computing device establishes a first communication session between a first conversation service application and a first remote computing device, the first conversation service application coupled to an orchestration utility of the computing device. The orchestration utility detects a request to transfer the first communication session to a second remote computing device. The orchestration utility captures context data generated during the first communication session including a state of the first communication session. The computing device establishes a second communication session between a second conversation service application and the second remote computing device, the second conversation service application coupled to the orchestration utility.

The orchestration utility configures the second communication session based upon the context data, including synchronizing a state of the second communication session to the state of the first communication session.

Any of the above aspects can include one or more of the following features. In some embodiments, the orchestration utility listens to messages received by the first conversation service application from the first remote computing device during the first communication session. In some embodiments, detecting the intent to transfer the first communication session to the second remote computing device comprises determining, by the orchestration utility, the intent to transfer the first communication session to the second remote computing device by analyzing the messages received from the first computing device during the first communication session.

In some embodiments, capturing context data generated during the first communication session comprises receiving, by the orchestration utility from the first conversation service application, one or more messages comprising the context data. In some embodiments, the context data comprises one or more of: the state of the first communication session, identifying information for a user of the first computing device, identifying information for the second remote computing device, identifying information for the second conversation service application, and authentication credentials for the user of the first computing device. In some embodiments, the orchestration utility captures at least a portion of the context data from a data store coupled to the server computing device.

In some embodiments, the state of the first communication session comprises an in-progress workflow status of the first conversation service application during the first communications session. In some embodiments, synchronizing the state of the second communication session to the state of the first communication session comprises configuring the state of the second conversation service application to match the in-progress workflow status of the first conversation service application from the context data. In some embodiments, the orchestration utility detects completion of a portion of the in-progress workflow at the second conversation service application and receives an updated state of the second conversation service application. In some embodiments, upon receiving the updated state of the second conversation service application, the orchestration utility updates the state of the first conversation service application to match the updated state of the second conversation service application. In some embodiments, upon the first conversation service application continues the first communication session with the first remote computing device using the updated state of the first conversation service application.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of capturing and utilizing cross-channel context data in conversation service application communication sessions.

FIG. 3 is a workflow diagram of an exemplary process for transitioning between conversation service applications.

DETAILED DESCRIPTION

Figure 1:
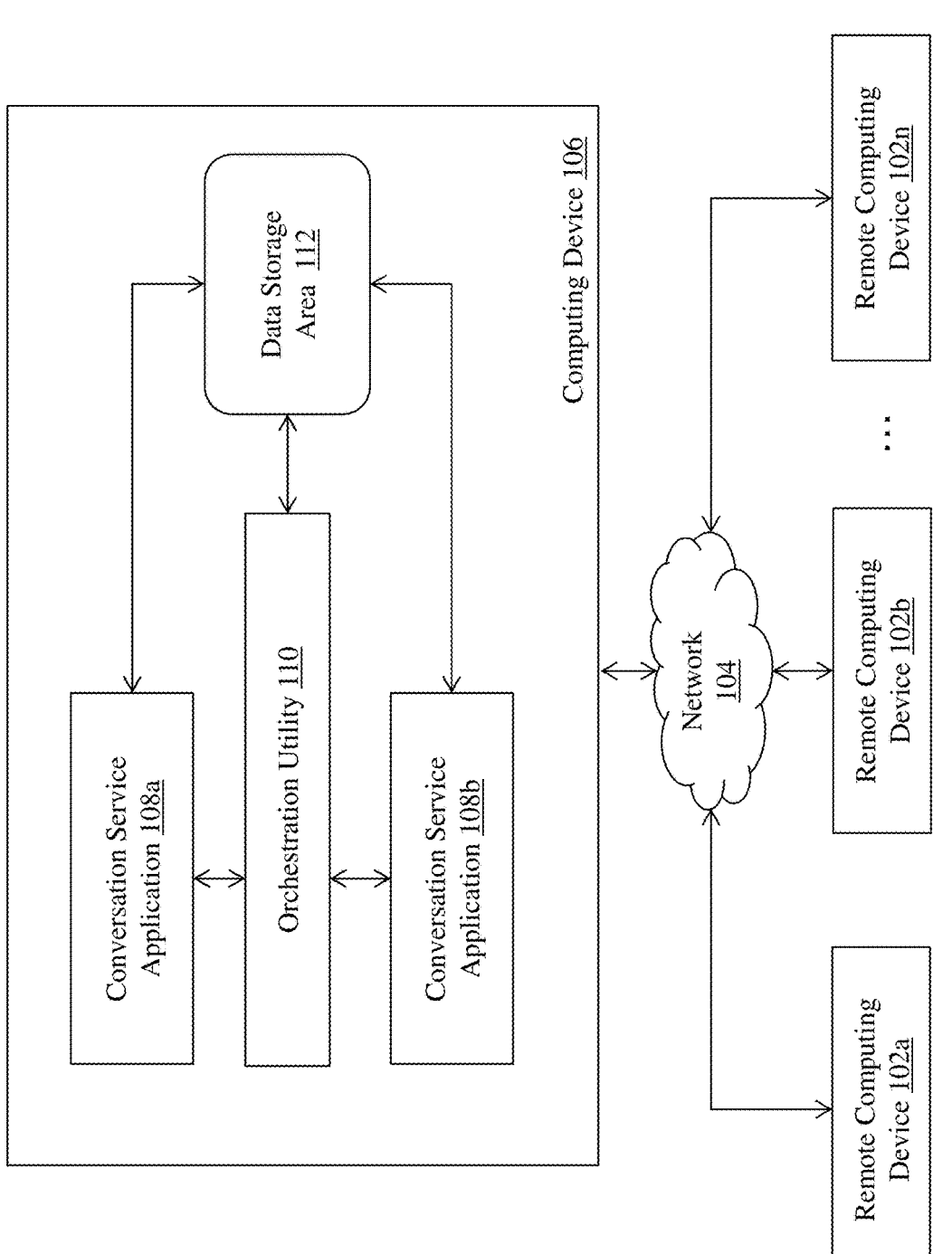
FIG. 1 is a block diagram of a system for capturing and utilizing cross-channel context data in conversation service application communication sessions.

FIG. 1 is a block diagram of system 100 for capturing and utilizing cross-channel context data in conversation service application communication sessions. System 100 includes remote computing device 102, communications network 104, computing device 106 that includes a plurality of conversation service applications 108a-108b (e.g., chatbots and/or virtual assistant (VA) applications), orchestration utility 110, and data storage area 112.

Remote computing devices 102a-102n connects to one or more communications networks (e.g., network 104) in order to communicate with computing device 106 to provide input and receive output relating to one or more conversation service application communication sessions as described herein. Exemplary remote computing devices 102a-102n include but are not limited to server computing devices, desktop computers, laptop computers, tablets, mobile devices, smartphones, smart assistant devices (e.g., smart speakers), and the like. It should be appreciated that other types of computing devices that are capable of connecting to the components of system 100 can be used without departing from the scope of the technology described herein. Although FIG. 1 depicts three remote computing devices 102a-102n, it should be appreciated that system 100 can include any number of remote computing devices.

In some embodiments, remote computing device 102a is configured with text chat application software, which enables remote computing device 102a to establish a text chat-based communication session with the computing device 106 via conversation service application 108a of computing device 106. In some embodiments, remote computing device 102b is configured with voice chat application software, which enables remote computing device 102b to establish a voice-based communication session with the computing device 106 via conversation service application 108b of computing device 106.

Communications network 104 enables remote computing devices 102a-102n to communicate with the computing device 106. Network 104 is typically comprised of one or more wide area networks, such as the Internet and/or a cellular network, and/or local area networks. In some embodiments, network 104 is comprised of several discrete networks and/or sub-networks (e.g., cellular to Internet).

Computing device 106 is a device including specialized hardware and/or software modules that execute on a processor and interact with memory modules of computing device 106, to receive data from other components of system 100, transmit data to other components of system 100, and perform functions for capturing and utilizing cross-channel context data in conversation service application communication sessions as described herein. Computing device 106 includes a plurality of conversation service applications 108a-108b and orchestration utility 110 that execute on the processor of the computing device 106. Computing device 106 also includes data storage area 112. In some embodiments, modules 108a, 108b, and 110 are specialized sets of computer software instructions programmed onto one or more dedicated processors in the computing device.

As can be appreciated, in some embodiments conversation service applications 108*a*, 108*b* comprise a virtual assistant (VA) software application (e.g., chatbot, interactive voice response (IVR) system, intelligent personal assistant) configured to automatically interact with a user or users at remote computing devices 102*a*-102*n* in order to gather information and/or respond to inquiries. An exemplary conversation service application can be based upon a natural language processing (NLP) and/or natural language understanding (NLU) architecture which intelligently parses text messages received from client computing devices to understand the intent and context of the message and how to best respond to it. In some embodiments, conversation service applications 108*a*-108*n* can establish a chat-based communication session (e.g., voice, text, or both) with remote computing devices 102*a*-102*n* to enable the user at the remote devices to participate in an interactive communication session with conversation service applications 108*a*-108*n*. In these embodiments, conversation service applications 108*a*-108*n* provides the interface for the exchange of messages between the computing device 106 and remote computing devices 102*a*-102*n*.

In some embodiments, conversation service applications 108*a*-108*n* can interface with one or more NLP services. Generally, an NLP service comprises a computing resource that is configured to analyze incoming user messages (e.g., messages received from remote computing devices 102*a*-102*n* as part of a communication session with conversation service applications 108*a*-108*b*) and provide a determined intent associated with the user message(s). As can be appreciated, a main goal of many chatbots and VA applications is to parse incoming user messages, process the messages using a NLP module to understand the user's input and to determine a user intent for the messages. Then, based upon the determined user intent, the conversation service applications 108*a*-108*b* can formulate a response to the user messages (e.g., provides information, answers a question, initiates a transaction, etc.) that satisfies the user intent and continues the conversation flow. In some embodiments, NLP services can be application programming interfaces (APIs) that are called by conversation service applications 108*a*-108*b* using one or more function calls including parameters such as the user messages. It should be appreciated that NLP services can be located on computing device 106 and/or one or more computing devices that are separate from computing device 106 (e.g., service endpoints, remote servers and the like). Exemplary NLP services include but are not limited to Google® Dialogflow™, Amazon® Lex™, and Microsoft® Azure Bot™.

The plurality of conversation service applications 108*a*-108*b* are coupled to orchestration utility 110 which comprises a software module configured to coordinate the exchange of messages and other data events between (i) a first communication session between a first remote computing device and a first conversation service application, and (ii) a second communication session between a second remote computing device and a second conversation service application.

Generally, orchestration utility 110 can utilize a message-based paradigm, where orchestration utility 110 is configured to connect to conversation service applications 108*a*-108*b* to receive messages and related metadata associated with specific events or event types from, and transmit messages and related metadata associated with specific events or event types to, conversation service applications 108*a*-108*b*. When a message is received by orchestration utility 110 from a first conversation service application, orchestration utility 110 can determine a second conversation service application to which the message should be directed. The second conversation service application can receive the message and perform one or more actions in response to the message. In some embodiments, applications 108*a*, 108*b* can monitor orchestration utility 110 (e.g., by listening for certain messages to appear) and invoke specific actions when those messages are detected.

Although applications 108*a*-108*b* and orchestration utility 110 are shown in FIG. 1 as executing within a same computing device 106, in some embodiments the functionality of the applications 108*a*-108*b* and orchestration utility 110 can be distributed among one or a plurality of other computing devices that are coupled to computing device 106. As shown in FIG. 1, computing device 106 enables applications 108*a*-108*b* and orchestration utility 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the technology described herein. The functionality of applications 108*a*-108*b* and orchestration utility 110 will be described in greater detail throughout this specification.

Data storage area 112 is a memory location resident on computing device 106 (or in some embodiments, one or more other computing devices). Data storage area 112 is configured to receive, generate, and store specific segments of data relating to the process of capturing and utilizing cross-channel context data in conversation service application communication sessions as described herein. In some embodiments, data storage area 112 is configured as part one or more of conversation service applications 108*a*-108*b* of computing device 106 to manage a communication session with one or more remote computing devices 102*a*-102*n*.

FIG. 2 is a flow diagram of a computerized method 200 of capturing and utilizing cross-channel context data in conversation service application communication sessions, using system 100 of FIG. 1. An end user at a first remote computing device (e.g., device 102*a*) can interact with one or more software applications on the device to perform a variety of tasks, including but not limited to information retrieval from local and/or remote data sources. For example, the user can launch a browser application to access one or more websites and/or webpages (either internally or externally hosted) in order to view information and submit queries for retrieval of additional information. In one embodiment, the user of the first remote computing device is a customer accessing a company website to retrieve information (e.g., product information, account information, customer service information, and the like).

As can be appreciated, in some instances the information that the end user is seeking may not be readily available or the end user may have additional questions that he or she cannot resolve using only the information provided by the software application. In these instances, the end user may want to interact with a conversation service application 108*a*-108*b* made available by computing device 106. For example, an end user at the first remote computing device may want to connect to conversation service application 108*a* for real-time assistance in resolving a problem or answering a question. The end user can provide input to the first remote computing device to cause the device to connect to computing device 106 and/or the first remote computing device can automatically connect to computing device 106.

Once connected, the first remote computing device 102*a* establishes (step 202) a first communication session with a first conversation service application 108*a*. In some embodiments, the browser or native application on remote computing device 102*a* connects to conversation service application 108*a* and provides one or more data elements that may relate to the user's intent or reason for accessing conversation service application 108*a*. The data elements can include, but are not limited to, utterances or user messages (e.g., voice or text questions, requests, or instructions submitted by the end user), data associated with remote device 102*a*, authentication credentials, and so forth. Based upon the data elements, conversation service application 108*a* initiates a workflow to determine a user intent (i.e., what the user wants to achieve) based on the user's input/messages and provide relevant responses. In some embodiments, conversation service application 108*a* maintains a workflow state associated with the first communication session—generally, the workflow state corresponds to the status of the conversation service application's response to the user intent at a certain point in time. For example, if the user intent is to change her mailing address, the workflow could comprise (i) determining an identity of the user; (ii) accessing her profile information; (iii) requesting the new address information from the user; (iv) asking the user to confirm the change; and (v) updating the user's address information in a database. In this example, the workflow state corresponds to which step of the workflow is currently being processed or handled in the communication session.

Prior to or during establishment of the first communication session, conversation service application 108*a* also connects to orchestration utility 110. As described above, orchestration utility 110 coordinates the exchange of messages and other data events between (i) a first communication session between a first remote computing device and a first conversation service application, and (ii) a second communication session between a second remote computing device and a second conversation service application. In some embodiments, during execution of the workflow in the first communication session, orchestration utility 110 is configured to receive messages from the first conversation service application 108*a*, including messages associated with a current state of the workflow. In some embodiments, orchestration utility 110 listens for the messages to be sent from conversation service application 108*a*, while in other embodiments orchestration utility 110 periodically requests workflow state information from conversation service application 108*a*. Orchestration utility 110 can store the workflow state in, e.g., data storage area 112.

The ability for the orchestration utility 110 and/or conversation service applications 108*a*-108*b* to listen for messages relating to status of the conversation/workflow is particularly beneficial when an end user is conducting simultaneous communication sessions with multiple conversation service applications 108*a*-108*b* via multiple remote devices 102*a*-102*n*. As an example, an end user can authenticate to several remote devices 102*a*-102*b* (e.g., mobile device, desktop) and corresponding conversation service applications 108*a*-108*b* (e.g., virtual assistants on each device) to have a multi-channel experience. Each conversation service application 108*a*-108*b* can periodically or continuously poll for a status of the multi-channel interaction to know where the conversation stands and synchronize their workflow state accordingly.

At some point after establishing the first communication session and initiating a corresponding workflow, the end user at remote computing device 102*a* may want to transition to another conversation service application (e.g., application 108*b*) that is accessed via a different remote computing device (e.g., device 102*b*). The end user may be having difficulty obtaining a desired or relevant response to her inquiries, or the end user can decide that a particular intent or workflow is better suited for completion using another device. For example, an end user may start a workflow to update her mailing address using a voice-based conversation service application on a smart speaker, then realize that she would rather simply type the new address information in via a text chat-based conversation service application on her mobile device. The end user can interact with the first conversation service application 108*a* to request a transition of the communication session to a second conversation service application 108*b* (e.g., by asking conversation service application 108*a* to continue the workflow on her mobile device).

In some embodiments, orchestration utility 110 of computing device 106 detects (step 204) a request to transfer the first communication session (i.e., between application 108*a* and device 102*a*) to a second remote computing device 102*b*. As mentioned above, in some embodiments, application 108*a* can transmit a message to orchestration utility 110 that indicates the user's transfer request and the desired destination application and/or device. In other embodiments, orchestration utility 110 listens for transfer requests received by conversation service application 108*a*.

Upon detecting a transfer request, orchestration utility 110 captures (step 206) context data generated during the first communication session between application 108*a* and device 102*a*. In some embodiments, the context data comprises a data object that includes a plurality of key-value pairs containing the context associated with the first communication session. As can be appreciated, the context data can include, but is not limited to, the workflow state data for the first communication session, user identifying information, device identifying information (i.e., the destination device/conversation service application that will receive the transfer), user credentials, etc. In some embodiments, orchestration utility 110 captures the context data from data storage area 112, conversation service application 108*a*, or both prior to acting on the transfer request.

The context data can comprise one data object or a plurality of data objects. An exemplary data object for storing the context data is provided below:

```
Bounded Context Object:
{
    Channel: web,
    crossChannelInteraction: true,
    Context: [chatbot1, mobileBot2],
    crossChannelEnabled: true,
    latestEvent: 1:23:45
}
```

An exemplary data object for storing the workflow status is provided below:

```
Status Object:
{
    Id: 123,
    customerId: 123,
    metadata: {...}
}
```

Orchestration utility 110 establishes (step 208) a second communication session between a second conversation service application 108*b* and the second remote computing device 102*b*. In some embodiments, orchestration utility 110 instructs conversation service application 108*b* to transmit a connection request to remote computing device 102*b* which causes device 102*b* to launch a software application (e.g., browser, native application) that completes the communication session with conversation service application 108*b*. For example, conversation service application 108*b* can transmit a request to a text-based chat application on remote computing device 102*b*, which automatically launches a text chat interface for continuation of the workflow started in the first communication session.

When the second communication session is established between conversation service application 108*b* and remote computing device 102*b*, orchestration utility 110 configures (step 210) the second communication session based upon the context data captured from the first communication session. In some embodiments, configuring the second communication session includes synchronizing a state of the second communication session to the state of the first communication session as represented in the context data. For example, orchestration utility 110 can identify the in-process workflow state of conversation service application 108*a* that was part of the first communication session and determine a corresponding workflow state of conversation service application 108*b*. Orchestration utility 110 then provides the workflow state and related information to conversation service application 108*b*, which automatically continues the conversation with the end user via remote computing device 102*b*. As a result, the end user does not need to re-enter or repeat any information that was exchanged with the first conversation service application 108*a* and can complete the workflow seamlessly on the new device 102*b*. In some embodiments, the end user can transition from the second communication session back to the first communication session using the same process as described above.

FIG. 3 is a workflow diagram of an exemplary process 300 for transitioning between conversation service applications, using system 100 of FIG. 1. As shown in FIG. 3, an end user starts a conversation (302) with a first conversation service application 108*a* (e.g., a voice assistant on a smart speaker) via a first communication session. At some point, orchestration utility 110 identifies (304) a cross-channel intent (e.g., the user's intent should be handled by another conversation service application 108*b*—a web browser on the user's desktop). Orchestration utility 110 sends (306) a message to conversation service application 108*b* to continue the workflow associated with the user intent in the web browser, and conversation service application 108*b* starts (308) the web interaction via the desktop. Orchestration utility 110 also sends (306) a message to conversation service application 108*a* regarding the transition to application 108*b*, and application 108*a* begins (310) waiting for an update on workflow status from utility 110 (i.e., periodically polling utility 110).

Conversation service application 108*b* gathers (312) responses from the end user via the browser channel, and orchestration utility 110 identifies (314) workflow status updates from the user responses. As the web interaction is still ongoing, utility 110 returns (316) a response to conversation service application 108*b* to continue with the workflow and application 108*b* continues (318) the web interaction. Meanwhile, application 108*b* continues to poll orchestration utility 110 for updates.

Conversation service application 108*b* completes (320) a portion of the workflow responsive to the user intent via web browser and provides a corresponding status update to orchestration utility 110 (i.e., the conversation should return to application 108*a*). Utility 110 identifies (322) the workflow status update from the application 108*b* and transmits the status update to conversation service application 108*a*, which receives (324) the status update and continues (326) the conversation via the voice assistant channel—e.g., by issuing further prompts to the end user. Now that the transition back to conversation service application 108*a* is complete, orchestration utility 110 listens for and receives (328) interaction information for the end user identifier on the voice assistant channel. Orchestration utility 110 processes (330) a response to the application 108*a*, which returns (332) a response to the end user via the appropriate voice assistant channel.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for capturing and utilizing cross-channel context data in conversation service application communication sessions, the system comprising a computing device having a memory that stores computer-executable instructions and a processor that executes the computer-executable instructions to:

establish (i) a first communication session between a first conversation service application and a first remote computing device associated with an end user and (ii) a simultaneous second communication session between a second conversation service application and a second remote computing device associated with the end user, which includes connecting each of the first conversation service application and the second conversation service application to an orchestration utility of the computing device;

execute, by the first conversation service application, a conversation workflow during the first communication session to respond to a determined user intent, including maintaining a workflow state of the first conversation service application that corresponds to a status of a response by the first conversation service application to the user intent;

detect, by the orchestration utility, input requesting to transfer active execution of the conversation workflow to the second remote computing device;

capture, by the orchestration utility, context data generated during the first communication session including the workflow state of the first conversation service application;

configure, by the orchestration utility, the second communication session based upon the context data, including synchronizing a workflow state of the second conversation service application to the workflow state of the first conversation service application; and continue, by the second conversation service application, active execution of the conversation workflow during the second communication session to respond to the determined user intent.

2. The system of claim 1, wherein the orchestration utility listens to messages received by the first conversation service application from the first remote computing device during the first communication session.

3. The system of claim 2, wherein detecting the intent to transfer the first communication session to the second remote computing device comprises determining, by the orchestration utility, the input requesting to transfer the first communication session to the second remote computing device by analyzing the messages received from the first computing device during the first communication session.

4. The system of claim 1, wherein capturing context data generated during the first communication session comprises receiving, by the orchestration utility from the first conversation service application, one or more messages comprising the context data.

5. The system of claim 4, wherein the context data comprises one or more of: the workflow state of the first conversation service application, identifying information for a user of the first computing device, identifying information for the second remote computing device, identifying information for the second conversation service application, and authentication credentials for the user of the first computing device.

6. The system of claim 5, wherein the orchestration utility captures at least a portion of the context data from a data store coupled to the server computing device.

7. The system of claim 1, wherein synchronizing the workflow state of the second conversation service application to the workflow state of the first conversation service application comprises advancing the workflow state of the second conversation service application from an initial workflow state to an in-progress workflow state that matches the workflow state of the first conversation service application.

8. The system of claim 7, wherein the orchestration utility detects completion of a portion of the conversation workflow at the second conversation service application and receives an updated workflow state of the second conversation service application based upon the completed portion of the conversation workflow.

9. The system of claim 8, wherein upon receiving the updated workflow state of the second conversation service application, the orchestration utility updates the workflow state of the first conversation service application to match the updated workflow state of the second conversation service application.

10. The system of claim 9, wherein the first conversation service application continues execution of the conversation workflow with the first remote computing device during the first communication session using the updated workflow state of the first conversation service application.

11. A computerized method of capturing and utilizing cross-channel context data in conversation service application communication sessions, the method comprising:

establishing, by a computing device, (i) a first communication session between a first conversation service application and a first remote computing device associated with an end user and (ii) a simultaneous second communication session between a second conversation service application and a second remote computing device associated with the end user, which includes connecting each of the first conversation service application and the second conversation service application to an orchestration utility of the computing device;

executing, by the first conversation service application, a conversation workflow during the first communication session to respond to a determined user intent, including maintaining a workflow state of the first conversation service application that corresponds to a status of a response by the first conversation service application to the user intent;

detecting, by the orchestration utility, input requesting to transfer active execution of the conversation workflow to the second remote computing device;

capturing, by the orchestration utility, context data generated during the first communication session including the workflow state of the first conversation service application;

configuring, by the orchestration utility, the second communication session based upon the context data, including synchronizing a workflow state of the second conversation service application to the workflow state of the first conversation service application; and continuing, by the second conversation service application, execution of the conversation workflow during the second communication session to respond to the determined user intent.

12. The method of claim 11, wherein the orchestration utility listens to messages received by the first conversation service application from the first remote computing device during the first communication session.

13. The method of claim 12, wherein detecting the intent to transfer the first communication session to the second remote computing device comprises determining, by the orchestration utility, the input requesting to transfer the first communication session to the second remote computing device by analyzing the messages received from the first computing device during the first communication session.

14. The method of claim 11, wherein capturing context data generated during the first communication session comprises receiving, by the orchestration utility from the first conversation service application, one or more messages comprising the context data.

15. The method of claim 14, wherein the context data comprises one or more of: the workflow state of the first conversation service application, identifying information for a user of the first computing device, identifying information for the second remote computing device, identifying information for the second conversation service application, and authentication credentials for the user of the first computing device.

16. The method of claim 15, wherein the orchestration utility captures at least a portion of the context data from a data store coupled to the server computing device.

17. The method of claim 11, wherein synchronizing the workflow state of the second conversation service application to the workflow state of the first conversation service application comprises advancing the workflow state of the second conversation service application from an initial workflow state to an in-progress workflow state that matches the workflow state of the first conversation service application.

18. The method of claim 17, wherein the orchestration utility detects completion of a portion of the conversation workflow at the second conversation service application and receives an updated workflow state of the second conversation service application based upon the completed portion of the conversation workflow.

19. The method of claim 18, wherein upon receiving the updated workflow state of the second conversation service application, the orchestration utility updates the workflow state of the first conversation service application to match the updated workflow state of the second conversation service application.

20. The method of claim 19, wherein the first conversation service application continues execution of the conversation workflow with the first remote computing device during the first communication session using the updated workflow state of the first conversation service application.

21. The system of claim 1, wherein the first communication session is conducted between the first remote computing device and the first conversation service application in a first modality, and the second communication session is conducted between the second remote computing device and the second conversation service application in a second modality.

22. The system of claim 21, wherein the first modality comprises audible speech messages and the second modality comprises natural language text messages.

23. The method of claim 11, wherein the first communication session is conducted between the first remote computing device and the first conversation service application in a first modality, and the second communication session is conducted between the second remote computing device and the second conversation service application in a second modality.

24. The method of claim 23, wherein the first modality comprises audible speech messages and the second modality comprises natural language text messages.

* * * * *